United States Patent [19]
Yu

[11] Patent Number: 6,080,507
[45] Date of Patent: Jun. 27, 2000

[54] TRILAYER BATTERY SEPARATOR

[75] Inventor: Ta-Hua Yu, Charlotte, N.C.

[73] Assignee: Celgard Inc., Charlotte, N.C.

[21] Appl. No.: 09/059,126

[22] Filed: Apr. 13, 1998

[51] Int. Cl.[7] .................................................. H01M 2/16
[52] U.S. Cl. ........................... 429/62; 429/145; 156/163; 264/173.11; 428/315.9
[58] Field of Search ..................... 429/62, 145; 156/163; 428/315.9; 264/173.11

[56] References Cited

U.S. PATENT DOCUMENTS

| | | | |
|---|---|---|---|
| 3,870,593 | 3/1975 | Elton et al. | |
| 4,350,655 | 9/1982 | Hoge | 264/145 |
| 4,539,256 | 9/1985 | Shipman | 428/315.5 |
| 4,650,730 | 3/1987 | Lundquist et al. | 429/62 |
| 4,698,372 | 10/1987 | Moss | 521/145 |
| 4,726,989 | 2/1988 | Mrozinski | 428/315.5 |
| 4,731,304 | 3/1988 | Lundquist et al. | 429/62 |
| 4,777,073 | 10/1988 | Sheth | 428/155 |
| 5,281,491 | 1/1994 | Rein et al. | 429/62 |
| 5,565,281 | 10/1996 | Yu et al. | 429/62 |
| 5,667,911 | 9/1997 | Yu et al. | 429/144 |
| 5,691,047 | 11/1997 | Kurauchi et al. | 429/145 X |
| 5,691,077 | 11/1997 | Yu | 429/62 |
| 5,824,430 | 10/1998 | Higuchi et al. | 429/62 |

FOREIGN PATENT DOCUMENTS

| | | |
|---|---|---|
| 0872900A2 | 10/1998 | European Pat. Off. |
| 7-307146 | 11/1995 | Japan. |
| 96250097 | 9/1996 | Japan. |
| 2 298 817 | 9/1996 | United Kingdom. |

OTHER PUBLICATIONS

Patent Abstracts of Japan vol. 013, No. 106 (E–726), Mar. 14, 1989 & JP 63 276868 A (Tokuyama Soda Co., Ltd), Nov. 14, 1988.

Patent Abstracts of Japan vol. 097, No. 001, Jan. 31, 1997 & JP 08 250097 A (Kureha Chem Inc Co Ltd), Sep. 27, 1996.

U.S. Application Serial No. 08/896,513, filed Jun. 22, 1997 entitled *Ultra–thin, Single–ply Battery Separator;* Inventor: Wei–Ching Yu; application consisting of 12 pages and 0 sheets of drawings.

U.S. Continuation Application Serial No. 08/650,210; filed May 20, 1996 entitled *Shutdown, Trilayer Battery Separator;* Inventor: Wei–Ching Yu; application consisting of 27 pgs. and 2 sheets of drawings.

*Primary Examiner*—Stephen Kalafut
*Attorney, Agent, or Firm*—Robert H. Hammer, III

[57] ABSTRACT

A trilayer shutdown battery separator is provided having two strength layers sandwiching a shutdown layer that is made by a particle stretch method. The preferred method of making such a trilayer separator comprises: making microporous strength layers; forming a microporous shutdown layer by a particle stretch method; and bonding two microporous strength layers and one microporous shutdown layer into the trilayer battery separator wherein the first and third layers are strength layers, and the second membrane is a microporous shutdown layer made by a particle stretch method.

16 Claims, 1 Drawing Sheet

TRILAYER BATTERY SEPARATOR

FIELD OF THE INVENTION

This invention generally relates to a trilayer shutdown battery separator, and the method of making same.

BACKGROUND OF THE INVENTION

A battery normally comprises electrodes, electrolyte, and battery separators. Battery separators are located between adjacent anodes and cathodes in a battery to prevent direct contact between electrodes of opposite polarity and to contain electrolyte.

In lithium batteries (e.g., lithium ion or lithium secondary battery) which are increasingly popular, short-circuiting is a problem as it tends to cause thermal runaway and even explosion. Thus, shutdown separators have been developed to cope with this problem. (See, e.g., U.S. Pat. No. 4,650,730 and U.S. Pat. No. 4,731,304 both issued to Lundquist et al.) A shutdown battery separator is a microporous membrane which closes its pores at some temperature well below the melting and/or ignition point of lithium to minimize the negative impact of thermal runaway.

Microporous membranes made of polymers such as polypropylene which give rise to higher puncture strength often have a high melting temperature, near the melting point of lithium, which is a drawback for using these polymers to form shutdown separators for lithium batteries. On the other hand, microporous membranes made of polymers such as polyethylene generally have low melting temperature. But their puncture strength is generally low. Thus, trilayer shutdown batteries have been proposed comprising two microporous polypropylene membranes sandwiching a polyethylene membrane.

Japanese Patent Application No. 98395/1994 (JP7-304110A) filed May 12, 1994 by Ube Industires, Ltd. discloses a microporous trilayer battery separator having a polypropylene-polyethylene-polypropylene construction. The trilayer battery separator has a pore-closing shutdown temperature of 135 to 140° C. The process of preparing the separator includes the steps of: extruding a polypropylene non-porous precursor; extruding a polyethylene non-porous precursor; forming the polypropylene-polyethylene-polypropylene non-porous trilayer precursor; bonding the trilayer precursor together; heat-treating (annealing) the bonded precursor; and stretching the bonded, annealed precursor to form the porous, trilayer separator.

U.S. Pat. No. 5,691,077 to Yu also teaches a trilayer battery separator having a polypropylene-polyethylene-polypropylene construction. The shutdown temperature given in the example is 132° C. The process for making the trilayer battery separator includes the steps of: forming a porous polypropylene precursor; forming a porous polyethylene precursor; forming a porous trilayer precursor; and bonding the porous trilayer precursor to form the trilayer battery separator.

UK Patent Publication No. GB 2,298,817 describes a microporous trilayer battery separator made by co-extruding a trilayer film precursor having a non-porous polypropylene-polyethylene-polypropylene construction, annealing the trilayer precursor, and then stretching the annealed trilayer precursor to form the porous trilayer battery separator. The separator has a shutdown temperature of 135° C. as given in the examples.

A porous trilayer separator is also proposed in Japanese Patent Application No. 56320/1995 (JP8-250097A) filed by Kureha Chemical Industry Co. Ltd., and is purported to have a shutdown temperature in the range of from 100° C. to 150° C. However, in the working examples, the shutdown temperature of the trilayer separators is 124° C. The Kureha separator is prepared by a process that includes the steps of: co-extruding a trilayer precursor, which contains, e.g., a solvent extractable material as pore forming aid, and forming the pores in the precursor by solvent extraction of the extractable-laden precursor.

A microporous shutdown separator should be thin enough to minimize the space it occupies in the battery and to reduce electrolytic resistance. Nevertheless the shutdown separator must also have sufficient strength to resist splitting and puncture. Although these two attributes, i.e., thinness and strength, are each very important, the two cannot be maximized since film strength typically varies inversely with film thickness. Moreover, it is also desirable to provide a separator having a shutdown temperature lower than 120° C., preferably within the range of from about 95° C. to about 115° C., while having a higher temperature at which the integrity of the separator can be maintained. As discussed above, the previously disclosed trilayer shutdown separators all have a shutdown temperature higher than 120° C. This is largely because the methods heretofore known for lowering shutdown temperature either compromise separator thinness or substantially weaken separator strength and interfere with the ability to manufacture the separator. Consequently, there has not been available in the art a trilayer separator having a shutdown temperature of lower than 120° C. while still possessing satisfactory thinness as well as sufficient strength. Thus, there is further need for high quality battery separators.

SUMMARY OF THE INVENTION

The three desirable features, i.e., satisfactory thinness, sufficient strength, and relatively low shutdown temperature, are achieved in the trilayer shutdown battery separator provided in the present invention. The trilayer shutdown battery separator has two microporous strength layers sandwiching one inner microporous shutdown layer. The microporous inner layer is formed by a particle stretch method. Preferably, the shutdown temperature of the trilayer separator is within the range of from about 80° C. to about 120° C., more preferably from about 95° C. to about 115° C. Methods of making the trilayer shutdown separator are also provided. A preferred method comprises the following steps: (a) extruding non-porous strength layer precursors; (b) annealing and stretching the non-porous precursor to form microporous strength layers; (c) forming a microporous inner layer by a particle stretch method; and (d) bonding two strength layers and one shutdown layer into the trilayer battery separator wherein the first and third layers are strength layers, and the second layer is said microporous membrane made by a particle stretch method.

DETAILED DESCRIPTION OF THE INVENTION

Figure 1:
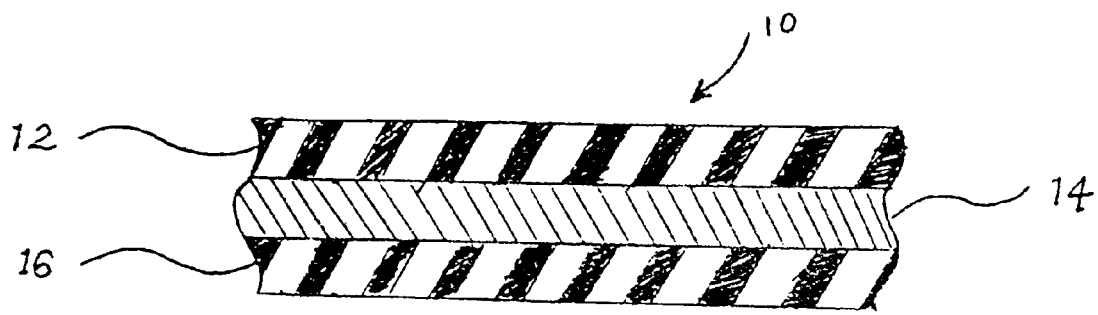
FIG. 1 is a schematic diagram illustrating the three-layer construction of the trilayer battery separator of the present invention.

The present invention relates to a trilayer shutdown battery separator comprising two strength layers sandwiching one shutdown layer. The shutdown inner layer is formed by a particle stretch method as discussed in detail below.

FIG. 1 illustrates a preferred embodiment of shutdown battery separator (10) which comprises a trilayer microporous film for use in electrochemical cells, e.g., batteries, particularly rechargeable batteries, such as lithium batteries. This trilayer separator has three microporous membranes bonded together. The first (12) and third (16) layers, i.e., the two outer layers, are strength layers. The second (14) layer, i.e., the inner layer, is a shutdown layer. The shutdown layer is capable of melting and closing the pores at a temperature (shutdown temperature) below the melting point of the strength layers and substantially below the temperature at which thermal runaway can occur. Preferably, the shutdown temperature of the trilayer battery separator has a shutdown temperature of less than about 124° C., and is in the range of from about 80° C. to about 124° C., more preferably from about 95° C. to about 115° C. Preferably the trilayer battery separator has a thickness of less than 2 mils, more preferably less than 1.5 mils, and most preferably no greater than 1 mil.

The trilayer battery separator exhibits reduced splitness and good puncture strength while still having satisfactory thinness and desirable low shutdown temperature.

In addition, as described below, the inner layer contains fillers which generally have much greater heat conductivity than polymer matrix. Therefore, compared with the trilayer battery separators heretofore known in the art, the trilayer separator of the present invention has a more uniform heat distribution during battery operation, and thus promotes a safer battery by preventing overheating in battery cells.

The strength layers can be composed of, for example, a polyolefin such as polypropylene or polyethylene, or a blend comprising substantially polypropylene or polyethylene or copolymer thereof. Preferably, polypropylene or a blend formed substantially entirely of polypropylene (e.g., 95% by weight of polypropylene or greater) is used as the polymer forming the strength layers. An exemplary polypropylene is Fina PP 3271 resin commercially available from Fina Oil and Chemical Company, Dallas Texas.

The strength layers can be made with methods known in the art for making microporous membranes, including but not limited to a stretch method, an extraction method (see, e.g., Japanese Patent Application No. 56320/1995, filed by Kureha Chemical Industry Co. Ltd. on Mar. 15, 1995, which is incorporated herein by reference) and a particle stretch method (see, e.g., U.S. Pat. Nos. 3,870,593 and 4,777,073, both of which are incorporated herein by reference). Preferably, they are made by a stretch method which involves subjecting pre-formed non-porous membranes to uniaxial or biaxial stretching to make them microporous.

Broadly speaking, the preferred stretch method for making the outer strength layers comprises extruding, e.g., a polypropylene polymer or copolymer to form a membrane, annealing the membrane, and stretching the annealed membrane. By way of nonlimiting example, suitable methods for this purpose are disclosed in U.S. Pat. Nos. 3,426,754; 3,588,764; 3,679,538; 3,801,404; 3,801,692; 3,843,761;3, 853,601; 4,138,459; 4,539,256; 4,726,989; 4,994,335; and 5,565,281, each of which is incorporated herein by reference. In particular, the improved methods for making thinner films disclosed in U.S. patent application Ser. No. 08/650, 210 filed May 20, 1996, and U.S. patent application Ser. No. 08/896,513 filed Jun. 22, 1997, are preferred. Each of the foregoing is incorporated herein by reference.

The inner shutdown layer of the present invention is made by a particle stretch method. By "particle stretch method" is intended a method of forming a microporous film comprising stretching a precursor film made from a polymer matrix filled with solid fillers dispersed therein. The stretching results in pore formation due to stress concentration, whereby the film is rendered microporous. Any particle stretch method known in the art may be used for making the inner layer of this invention. Examples of such methods can be found in, for example, U.S. Pat. Nos. 3,870,593; 4,350, 655; 4,698,372; and 4,777,073, all of which are incorporated herein by reference.

Specifically, the shutdown layer of this invention is produced by stretching a precursor film that is extruded from a polymer composition comprising a polymer and a filler. Optionally, the polymer composition may also include conventional additives such as stabilizers, antioxidants, and the like.

Any polymer suitable for film production may be used for making the inner layer of the trilayer battery separator of this invention. Examples of such polymer include, but not limited to, polyolefins, polysulfones, polyvinyl choride, polyvinyl fluoride, polytetrafluoroethylene-polystyrene copolymers, polyamides, polyphenyleneoxide-polysterene copolymers, polycarbonates and the like. Preferably, polyolefins are used. Exemplary polyolefins include but not limited to polypropylene, polyethylene, and blends comprising substantially one of the above compounds.

Preferably, polymers should be chosen so that the shutdown temperature falls within the range of from about 80° C. to about 120° C., preferably from about 95° C. to about 115° C. To achieve lower shutdown temperatures, it is preferred to use low density polyethylene (LDPE), linear low density polyethylene (LLDPE), or a blend comprising substantially LDPE, LLDPE or a mixture thereof. Particularly preferred is LLDPE, a random copolymer of ethylene and alpha-olefins selected from the group consisting of $C_{3-10}$ alpha-olefins having a polymerized alpha-olefin content of about 20 (preferably about 16)% by weight. The preferred examples of LLDPE include but not limited to copolymers of ethylene-butene and copolymers of ethylene-hexene.

Fillers useful in this invention must have a low affinity for and a significantly lower elasticity than polymer component. At the same time, fillers should have some interaction with the polymer. The fillers used must also have a melting point higher than that of the polymer used in the polymer composition. In addition, suitable filler preferably are non-hygroscopic and water-insoluble. By "non-hygroscopic" is intended that the filler does not absorb moisture from the air. Fillers may be any inorganic or organic material. Preferably the filler should be a rigid material having a non-smooth surface.

Examples of suitable fillers include but not limited to alumina, mica, barium carbonate, barium sulfate, calcium carbonate, calcium oxide, calcium sulfate, clay, diatomaceous earth, glass powder, kaolin, magnesium carbonate, magnesium sulfate, magnesium oxide, silica, silica clay, talc, titanium oxide, zinc oxide, etc. Examples of organic fillers include but not limited to polymer powders such as powders of poly(hexamethylene adipamide), poly(ethylene terephthalate), beads of poly(styrene divinyl benzene) and the like. Calcium carbonate is particularly preferred for use as the filler in this invention. In addition, the inorganic fillers such as calcium carbonate are preferably surface treated by coating on their surface with, for example, calcium stearate.

The amount of filler added to the polymer depends on the desired properties of the microporous film, including mechanical performance, permeability, and electrical resistance. Generally, the amount of filler used varies with different fillers. For example, in a polymer composition comprising LLDPE as polymer and calcium carbonate as filler, the amount of calcium carbonate preferably is from about 35 to about 65 percent by weight of the polymer composition. Minor experiment may be required to determine the optimum amount of filler with respect to different polymers and fillers, this being well within the capability of one skilled in the art once apprised of the present disclosure.

The particle size of the filler is determined to be very critical in this invention to make low temperature shutdown inner layer having a lower electric resistance. Preferably, smaller particles should be used in order to produce thinner microporous film. Furthermore, it is discovered for the first time that smaller filler particles leads to desirable lower electric resistance. Among the commercially available fillers, it is found that a particle size of from 0.1 to 1 micron is most appropriate for producing thin microporous films having low electric resistance.

The polymer(s) and filler(s) in the polymer composition for making the precursor film for the inner layer must be uniformly and intimately mixed. Any suitable method of mixing known in the art can be used. For example, mixing may be achieved by premixing the polymer and filler together and then passing the blend through a compounding extruder. Mixing may also be conducted by feeding the polymer and filler components directly to a mixing device. Suitable mixing device include but not limited to a compounding extruder, high shear continuous mixer, two roll mill, or an internal mixer such as a Banbury mixer.

In accordance with the present invention, a precursor film can be extruded from the intimately mixed polymer composition described above, and the precursor film is then made microporous by stretching.

Extrusion can be achieved by methods generally known in the art including but not limited to cast extrusion and blown film extrusion.

Stretching or "orientation" of the precursor film may be carried out in conventional methods. The precursor film can be stretched uniaxially, either in the machine direction or in the transverse direction. It can also be stretched biaxially in both the machine direction and the transverse direction. When the film is biaxially stretched, the stretching in the two directions can be done either simultaneously or sequentially. When the polymer used in the polymer composition is LLDPE, blown films are preferably stretched in the machine direction or in both directions whereas cast films are preferably stretched in the transverse direction. Stretching can be done in conventional methods generally known in the art. An example of a preferred method is the one that is disclosed in U.S. Pat. No. 4,777,073 to Sheth, which is incorporated herein by reference.

After the microporous outer layers and microporous inner layer are made, they are laminated and bonded together into a trilayer battery separator having a structure as shown in FIG. 1. The bonding methods are generally known in the art. Suitable methods for use in this invention include calendaring, adhering with adhesives, and welding. The application of adhesives may include: air atomizing; gravure/screen printing; hydraulic spraying; and ultrasonic spraying. The choice of adhesive and the rate of adhesive application must be chosen so that the separator's porosity is not adversely effected. The welding technique includes thermal welding and ultrasonic welding. The amount of energy for either welding procedure and the pattern of weld should be chosen so that the separator's porosity is not adversely effected. Preferably bonding is done by calendaring, with nips closed, at a temperature of at least 1° C. below the melting point of the inner shutdown layer, preferably at a temperature of at least 5° C. below the melting point of the inner shutdown layer.

Optionally, a cross-plied trilayer battery separator can be made by cross-ply laminating the microporous layers such that one strength layer is angularly oriented relative to the other strength layer. Suitable methods of making cross-ply microporous battery separator are disclosed in U.S. Pat. No. 5,667,911, which is incorporated herein by reference.

After bonding, the trilayer shutdown battery separator is rewound for use in the manufacture of batteries, particularly secondary lithium batteries, as is well known in the art.

The invention is further illustrated with reference to the examples set forth below.

EXAMPLES

Example 1

A linear low density polyethylene(LLDPE) with a melt flow index of 2.0 was compounded with calcium carbonate particles that are surface-treated with calcium stearate. The calcium carbonate has an average particle size of 1 micron. Polymer compositions having LLPDE filled with 40%, 45%, and 50% by weight of $CaCO_3$ respectively were then cast extruded into precursor films, each having a thickness of approximately 2 to 8 mil. Each resulting precursor film was cooled and subjected to tenter stress in the transverse direction with a stretch ratio of 2.5 to 1. Stretching was performed in a tentering frame at approximately 65EC. One layer of the resulting white porous film was then sandwiched between two layers of Celgard® stretched polypropylene microporous membranes and bonded to form a trilayer battery separator.

This separator was tested to determine the electrical impedance versus temperature behavior. The testing method used herewith is described by R. Spotnitz et al. in Proceedings from the $12^{th}$ International Seminar on Primary and Secondary Battery Technology and Application, Mar. 6, 1995. The impedance was measured as the temperature was raised at a rate of 60° C./min. The impedance analysis showed an increase of impedance near 115° C. corresponding to melting of the shutdown inner layer, and a further increase in impedance occurs near 160° C. due to melting of the polypropylene outer layers.

Although the foregoing invention has been described in some detail by way of illustration and example for purposes of clarity of understanding, it will be obvious that certain changes and modifications may be practiced within the scope of the appended claims.

All publications and patent applications mentioned in the specification are indicative of the level of those skilled in the art to which this invention pertains. All publications and patent applications are incorporated herein by reference to the same extent as if each individual publication or patent application was specifically and individually indicated to be incorporated by reference.

What is claimed is:

1. A battery separator comprising a first and third microporous strength layer sandwiching a second shutdown layer, said shutdown layer being a microporous membrane made by a particle stretch process.

2. A battery separator of claim 1, wherein said battery separator has a shutdown temperature of about 115° C.

3. A battery separator of claim 1, wherein said shutdown layer comprises calcium carbonate particles as fillers.

4. A battery separator of claim 1, wherein said shutdown layer comprises a filler having a particle size of from about 0.1 micron to about 1 micron.

5. A battery separator of claim 1, wherein said strength layers are made of polypropylene and said shutdown layer is made of polyethylene.

6. A battery separator of claim 5, wherein said polyethylene is linear low density polyethylene.

7. A battery separator of claim 1, wherein said strength layer is made by a stretch method.

8. A battery separator comprising:
   first and third microporous polypropylene layers having a thickness of no greater than about 0.5 mil, said first and third polypropylene layers being made by a method comprising the steps of: extruding a parison; collapsing the parison onto itself to form a flat sheet comprising two plies; annealing the flat sheet; stretching the flat sheet, wherein the stretching comprising stretching in at least two steps and each at a different temperature; and winding up the flat sheet, an adhesion force between the two plies being less than 8 grams per inch;
   a second microporous shutdown layer being made by a particle stretch process and comprising linear low density polyethylene and a calcium carbonate particle filler having a particle size of from about 0.1 micron to about 1 micron, said shutdown layer being sandwiched between said first and third microporous polypropylene layers.

9. A method of making a trilayer battery separator comprising:
   forming a microporous shutdown layer membrane by a particle stretch method;
   forming microporous strength layer membranes;
   bonding said membranes into the trilayer battery separator wherein the first and third membranes are strength layers, and the second membrane is said shutdown layer formed by a particle stretch method.

10. A method of making a trilayer battery separator of claim 9, wherein said battery separator has a shutdown temperature of about 115° C.

11. A method of making a trilayer battery separator of claim 9, wherein said shutdown layer comprises calcium carbonate particles as filler.

12. A method of making a trilayer battery separator of claim 9, wherein said shutdown layer comprises a filler having a particle size of from about 0.1 micron to about 1 micron.

13. A method of making a trilayer battery separator of claim 9, wherein said strength layers are made of polypropylene and said shutdown layer is made of polyethylene.

14. A method of making a trilayer battery separator of claim 13, wherein said polyethylene is linear low density polyethylene.

15. A method of making a trilayer battery separator according to claim 9, wherein said microporous strength layers are made by a stretch method.

16. A method of making a trilayer battery separator comprising:
   making a first and third microporous polypropylene layer having a thickness of no greater than about 0.5 mil comprising the steps of: extruding a parison; collapsing the parison onto itself to form a flat sheet comprising two plies; annealing the flat sheet; stretching the flat sheet, wherein the stretching comprising stretching in at least two steps and each at a different temperature; and winding up the flat sheet, an adhesion force between the two plies being less than 8 grams per inch;
   making a second microporous shutdown layer by a particle stretch process which comprises the steps of: providing a blend comprising of a linear low density polyethylene and calcium carbonate particle fillers having a particle size of from about 0.1 micron to about 1 micron; extruding a precursor membrane from the blend; and stretching said precursor membrane to impart micropores; and
   bonding said polypropylene layers and said shutdown layer into the trilayer battery separator wherein the first and third membranes are the polypropylene layers, and the second membrane is said shutdown layer.

* * * * *